United States Patent [19]

Tucker

[11] Patent Number: 4,964,655
[45] Date of Patent: Oct. 23, 1990

[54] HEAVY DUTY MUD FLAP

[76] Inventor: Larry C. Tucker, 5145 Dewitt St., Bay City, Mich. 48706

[21] Appl. No.: 449,755

[22] Filed: Dec. 13, 1989

[51] Int. Cl.⁵ .............................................. B62D 25/16
[52] U.S. Cl. .................................. 280/851; D12/185
[58] Field of Search ............... 280/847, 848, 849, 851, 280/852, 152.3; D12/184, 185, 186

[56] References Cited

U.S. PATENT DOCUMENTS

| D. 279,560 | 7/1985 | Jensen | D12/185 |
|---|---|---|---|
| 2,758,401 | 8/1956 | Wilson | 280/851 X |
| 2,782,053 | 2/1957 | Long | 280/851 |
| 3,129,956 | 4/1964 | Eaves | 280/851 |
| 4,357,030 | 11/1982 | Verge | 280/851 |
| 4,382,606 | 5/1983 | Lightle et al. | 280/851 |

FOREIGN PATENT DOCUMENTS 0321968  9/1935  Italy ..................... 280/851

Primary Examiner—Charles A. Marmor
Assistant Examiner—Brian L. Johnson
Attorney, Agent, or Firm—H. Jay Spiegel

[57] ABSTRACT

The present invention relates to an improved heavy duty mud flap. The improved mud flap includes metal segments on the outer edges of the mud flap that allow movement of the mud flap in one direction only. The segments are connected by rods which contain a plurality of alternating rubber discs and spacers between the outer metal segments. The rubber discs and spacers freely rotate about the rods, such rotation helping to reduce snagging of the mud flap on objects or tires. The series of rubber discs and spacers also act to break up spray generated by vehicle tires coming in contact with wet conditions. Finally, a mounting device is included to attach the mud flap to a vehicle frame.

10 Claims, 2 Drawing Sheets

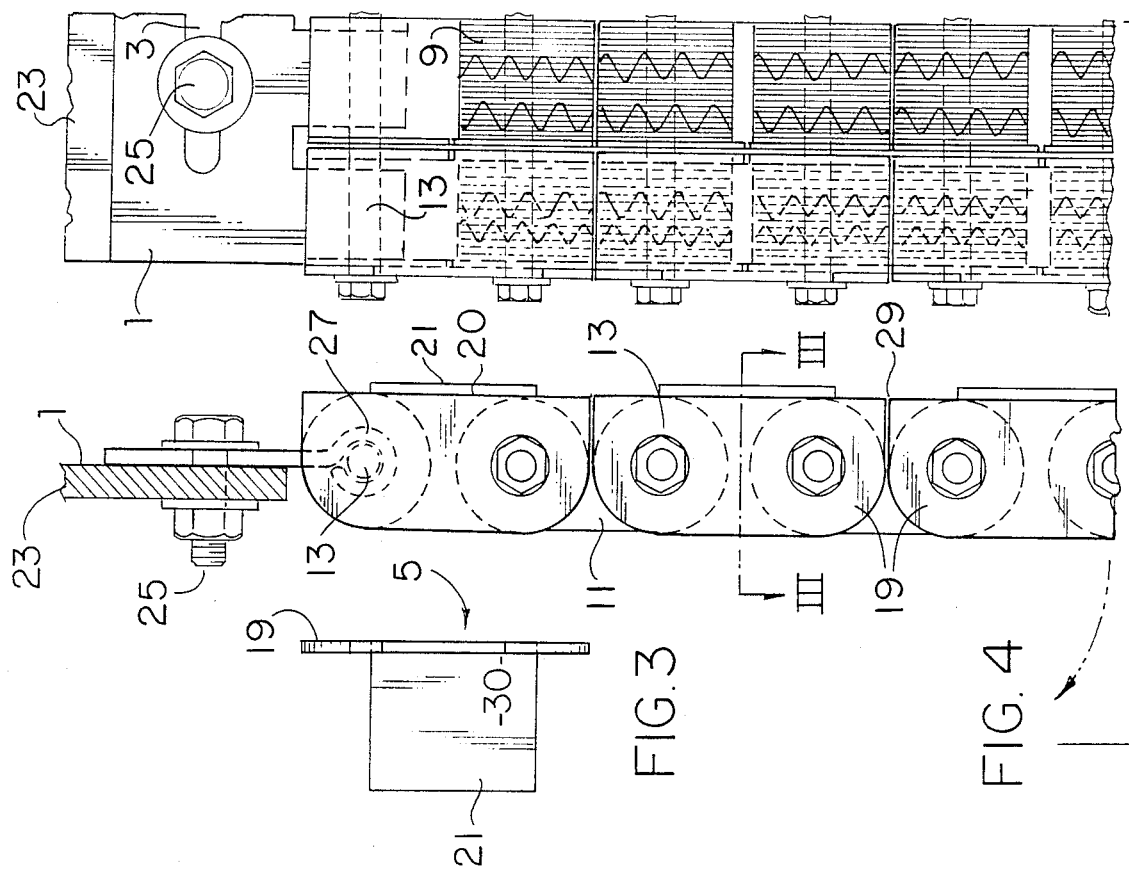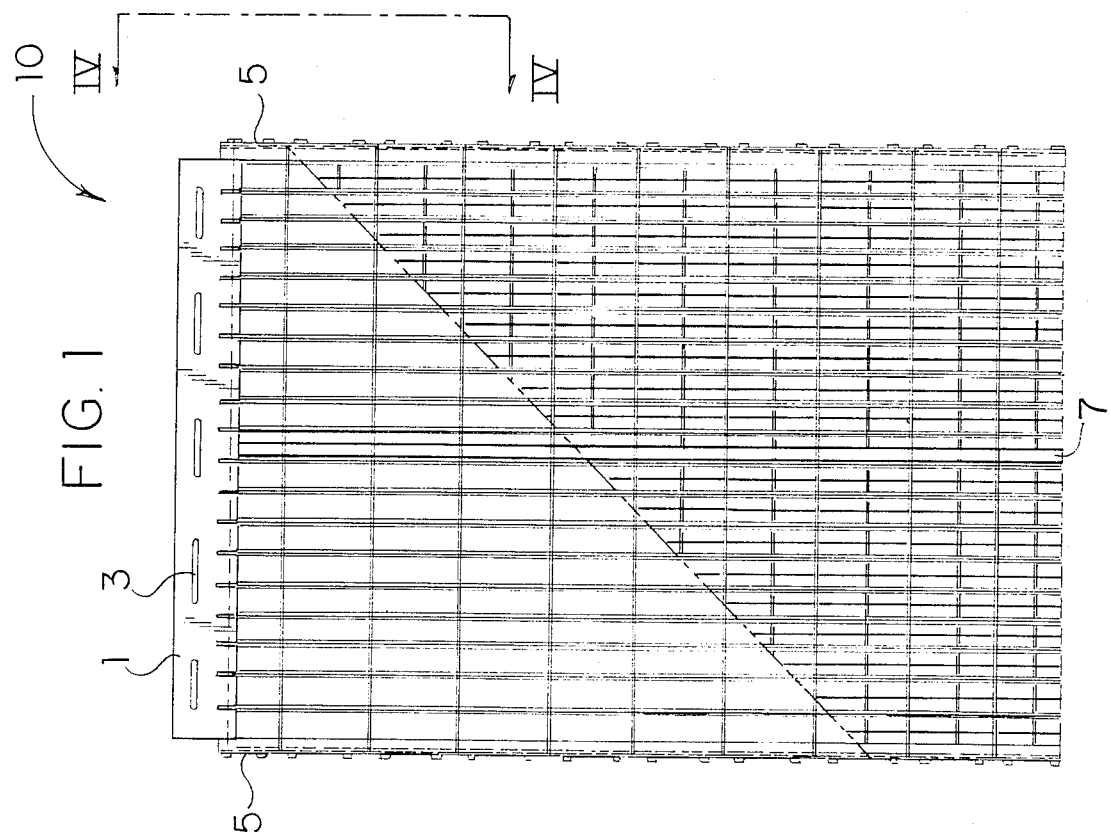

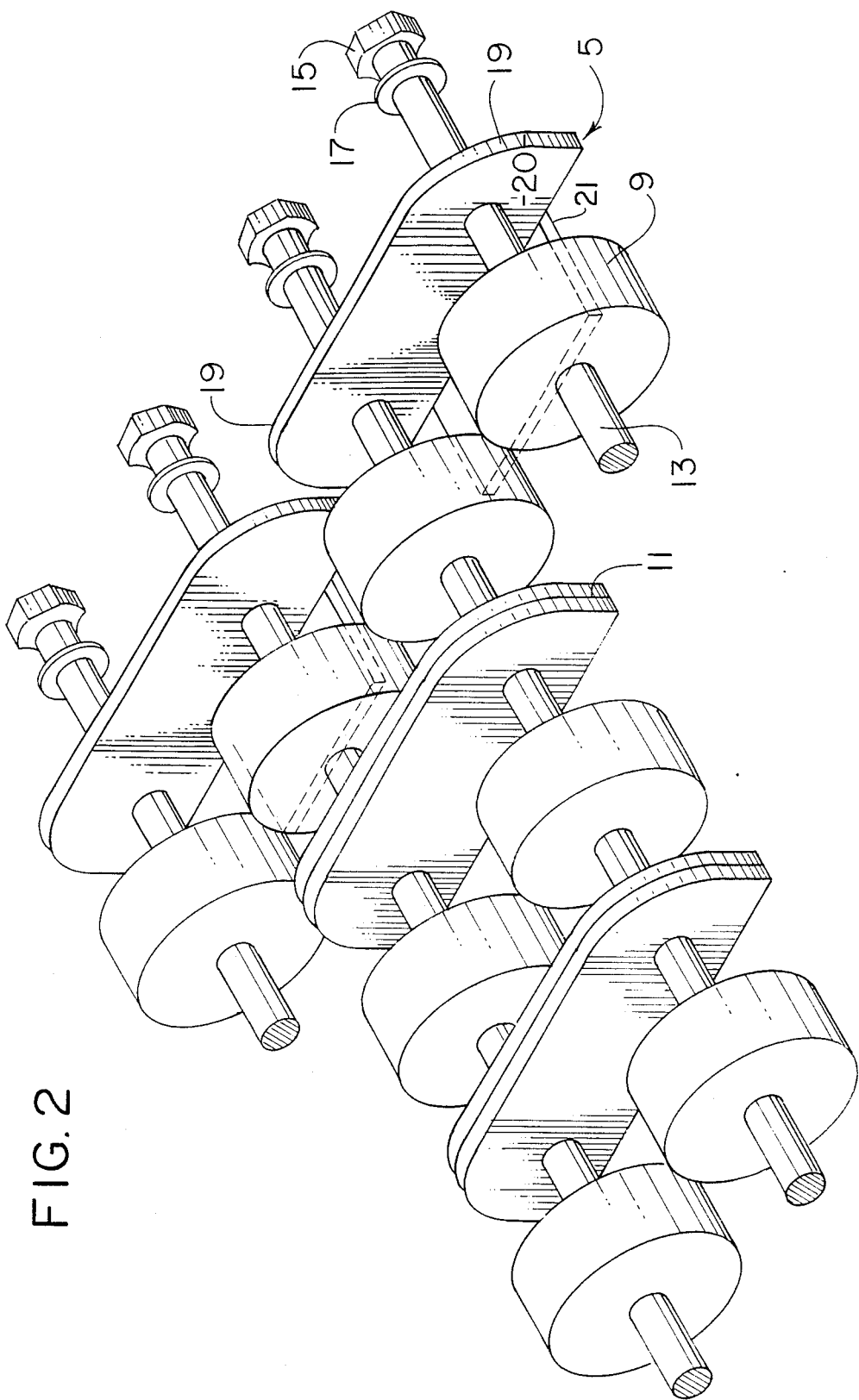

HEAVY DUTY MUD FLAP

BACKGROUND OF THE INVENTION

The present invention relates to an improved heavy duty mud flap. This invention is drawn to solving the problem caused by the blinding spray of water that is generated by large fast moving vehicles, such as large trucks and which spray present a serious driving hazard to adjacent and following vehicles. In the prior art, mud flaps in various designs exist and have been designed in an attempt to reduce or eliminate this aforementioned spray of water. U.S. Pat. No. 4,382,606 to Lightle et al. discloses an example of a mud flap for reducing the spray caused by fast moving vehicles and includes a flap having a combination of conical projections and upstanding ribs formed on the mud flap surface. The teachings of this patent are different from those of the present invention as failing to teach or suggest a mud flap having a plurality of rubber discs connected together with metal segments that allow movement of the mud flap in one direction only.

SUMMARY OF THE INVENTION

The present invention relates to a new and improved heavy duty mud flap. The present invention includes the following interrelated aspects and features.

(a) In a first aspect, the present invention provides an improved mud flap that travels in one direction only. This one-directional travel feature minimizes the excessive spray that is caused from tires contacting wet surfaces. Additionally, the improved mud flap contains features that prevent the mud flap from snagging or being caught on rotating tires as well as being damaged or torn off the vehicle when a truck is backing up. Finally, the improved mud flap includes features that minimize or prevent a mud flap from sailing such that the mud flap performs its function continuously while the vehicle is in motion.

(b) The improved mud flap of the present invention includes a plurality of metal segments made from angle iron material. Each segment has a particular radius on each end and a pair of openings therein. The metal segments are connected in series and may have one set of segments connected centrally on the mud flap. The metal segments are connected together by metal rods that extend through the openings contained in the metal segments and are attached to the outer segments by fastening means.

(c) The improved mud flap also includes a plurality of rubber discs, the rubber discs being located on the metal rods, with the discs being separated by spacers. The rubber discs freely rotate on the rods such that any contact between the tire or any other object and the mud flap will result in rotation of the discs rather than causing the mud flap to snag against the tire or other object. The discs and spacers also minimize excessive spray generated by wet surface conditions.

(d) Also included with the mud flap of the present invention are mounting means connected at the top of the mud flap to facilitate attaching the mud flap to a vehicle.

Accordingly, it is a first object of the present invention to provide a new and improved heavy duty mud flap.

It is further object of the present invention to provide a mud flap that is designed for one way movement to minimize excessive spray from vehicle tires contacting wet surfaces.

It is a yet further object of the present invention to provide an improved mud flap that contains features which prevent the mud flap from snagging or being damaged by tires or other objects.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a front view of the mud flap of the present invention.

FIG. 2 shows an exploded view of a portion of the mud flap of the present invention.

FIG. 3 shows a cross-sectional view along the line III—III of FIG. 4.

FIG. 4 shows a partial front view and a corresponding partial side view of a portion of the mud flap as attached to a vehicle frame.

SPECIFIC DESCRIPTION OF THE PREFERRED EMBODIMENT

With reference to FIGS. 1 and 2 firstly, the improved mud flap of the present invention is generally designated by reference numeral 10 and is seen to include an adjustable hanger 1 having openings 3 therein, outer metal segments 5, middle metal segments 7, rubber segments 9, spacers 11, retaining rods 13 and nuts and washers 15 and 17, respectively. As can be seen from FIG. 2, the mud flap has on each outer end a metal segment 5 having an angled iron configuration with one leg 20 having two aligned openings therein for receiving retaining rods 13. The leg 20 also has on each end thereof a curved portion 19 which allows movement of the mud flap in one direction only when the mud flap is completely assembled. The second leg of the metal segment 5 and designated by the reference numeral 21 is perpendicular to the first leg 20 and is attached on the edge of the leg 20. The leg 21 assists in acting as a stop against rotational movements of an adjacent metal segment 5.

FIGS. 3 and 4 more clearly depict the metal segments as attached to the frame of a vehicle. In these drawings, the adjustable hanger 1 is attached to a vehicle frame by a mounting bolt 25 and holds the assembled mud flap by retaining portion 27 holding retaining rod 13. The front view of the mud flap in FIG. 4 also depicts the adjustable feature of the hanger including the bolt 25 attached through opening 3 thereby allowing horizontal adjustment of the mud flap with respect to the vehicle frame.

With reference, again, to FIGS. 2 and 4, the hanger 1 is attached to a vehicle frame 23 by bolt 25. The mud flap as assembled has a plurality of mud flap segments, each mud flap segment comprising a pair of opposed metal segments 5 which are horizontally separated by a series of alternating rubber segments 9 and spacers 11, the rubber segments 9 and spacers 11 removably mounted on a pair of rods 13 passing through the openings of the rubber segments 9 and spacers 11 and leg 20 of the metal segments 5. Vertically adjacent mud flap segments are connected by spacers 11, each spacer 11 having a pair of openings, one opening therein for receiving a rod associated with a pair of opposed metal segments and a second opening therein for receiving a rod associated with a vertically adjacent pair of opposed metal segments, see FIG. 2. As such, vertically adjacent mud flap segments are connected by the spacers 11. In this arrangement, a plurality of mud flap segments assembled vertically produce a completely assembled mud flap.

The configuration of the outer metal segments 5 permits movement of the mud flap in one direction only as shown by the arrow in FIG. 4. In operation, the outer metal segments rotate in the direction of the arrow in FIG. 4, i.e., towards the tire, with curved portions 19 of adjacent outer metal segments contacting each other. The square portion of metal segments 5 designated by reference numeral 29 in FIG. 4 prevent movement of the mud flap in the opposite direction of the arrow depicted also in FIG. 4. The leg 21 further assists in preventing movement of the mud flap should the square portions 29 of metal segments 5 become misaligned. Spacers 11 have a configuration similar to leg 20 of metal segment 5 to further control movement in one direction.

The rod 13 having a removable nut and washer 15 and 17, respectively, allows the mud flap to be adjustable in height by merely adding or eliminating mud flap segments.

As seen in FIG. 1, a middle metal segment 7 similar to outer metal segment 5 is shown in the center of the assembled mud flap to provide additional restraint against movement in the direction away from the vehicle tires.

The rubber segments 9 may be made from used or discarded tires by an apparatus that can cut or punch out a series of discs from the used tires. The spacers may be any material, but a preferred material may include nylon, such material combining strength with light weight. The legs 21 of the metal segments 5 may include a reflective coating 30 on the surface opposite the tire to enhance night time safety.

Although the dimensions of the mud flap as assembled and the components thereof may vary according to the intended use, for example, size of truck, overall dimensions of mud flap, etc., a preferred dimension for the rubber segments may include about 1¼ inches in diameter, the metal segments may be fabricated out of three-quarter or one inch angle iron with a rod diameter being 3/16 of an inch. The vertical spacing between the rubber segments should be as small as possible to permit free rotation while acting to break-up spray generated from the tires contacting a wet surface.

The improved mud flap of the present invention offers many advantages over prior art mud flaps. The rubber discs freely rotating on the rods minimize snagging of the mud flap on articles or tires. The series of rubber segments and spacers also add to break up the spray generated by vehicle tires when driven in wet conditions. Furthermore, the one directional movement of the mud flap prevents the flap from moving away from the vehicle tire, thereby permitting the mud flap to be self cleaning through contact with the vehicle tire and rotation of the rubber discs.

As such, an invention has been disclosed in terms of a preferred embodiment thereof which fulfills each and every one of the objects of the present invention as set hereinabove and provides a new and improved mud flap of great utility and novelty.

Of course, many changes, modifications and alterations in the teachings of the present invention may be contemplated by those skilled in the art without departing from the intended spirit and scope thereof. As such, it is intended that the present invention only be limited by the terms of the appended claims.

I claim:

1. An improved mud flap for reducing spray from vehicle tires comprising:
    a) a plurality of mud flap segments, each mud flap segment further comprising:
        (i) a pair of retaining rods;
        (ii) at least a pair of laterally spaced metal segments, each metal segment having a first leg and a second leg, each said first leg having a pair of aligned openings therein and a first edge having a pair of opposed curved corners; each said second leg being attached to said first leg at a second edge of said first leg, said second edge being opposite said first edge, each respective said pair of metal segments being mounted on each respective said retaining rod;
        (iii) a plurality of laterally spaced rubber segments, each said rubber segment being mounted on each respective said retaining rod and being situated between each said pair of laterally spaced metal segments;
        (iv) a plurality of spacers, each said spacer having at least one opening therein for mounting said spacer on a respective said retaining rod, each respective said spacer being situated between said laterally spaced rubber segments;
    (b) wherein said mud flap segments are vertically connected together to form said mud flap.

2. The invention of claim 1, further comprising a mounting means for attaching a first mud flap segment to a vehicle.

3. The invention of claim 1, wherein each said rubber segment is circular in shape.

4. The invention of claim 1, wherein each said rubber segment is made from used tire rubber.

5. The invention of claim 1, wherein each said spacer includes a second opening therein, each respective said spacer being mounted on a vertically adjacent said retaining rod for vertically connecting said plurality of mud flap segments together.

6. The invention of claim 1, wherein each said spacer is made from a nylon material.

7. The invention of claim 1, further including a plurality of vertically aligned metal segments being situated centrally on said mud flap.

8. The invention of claim 5, wherein each said spacer includes a pair of opposed curved corners having substantially the same configuration as said opposed curved corners of said first leg of said metal segment.

9. The invention of claim 1, wherein each said metal segment is made from an iron material.

10. The invention of claim 1, wherein each said second leg includes a reflective coating thereon.

* * * * *